UNITED STATES PATENT OFFICE.

AQUILES ERNESTO V. CASTRO, OF MERIDA, MEXICO.

PROCESS FOR THE MANUFACTURE OF ALCOHOL.

996,400.  Specification of Letters Patent.  Patented June 27, 1911.

No Drawing.  Application filed December 28, 1910. Serial No. 599,763.

*To all whom it may concern:*

Be it known that I, AQUILES ERNESTO V. CASTRO, a citizen of the Republic of Mexico, residing in Merida, Yucatan, Mexico, have invented new and useful Improvements in Processes for the Manufacture of Alcohol, of which the following is a specification.

My improvement relates particularly to processes for the manufacture of alcohol from the juice obtained from sisal hemp leaves and from similar plants known as *Agaves*. Heretofore the fermentation and extraction of alcohol from the juice of these plants has required a slow fermentation extending over several days, and the object of my invention is to produce a quick and rapid fermentation, as quick as from four to six hours, whereby the output of a plant of a given size may be materially increased, the amount of labor reduced, and the cost of production cheapened.

According to my invention, I mix with the fresh and cold juice obtained from the above-mentioned plants a certain amount of scraped or pulverized raw potatoes, coarse brown sugar, ground Indian corn and the down of a plant called *pinuela*, and allow the mixture to ferment. I have found following proportions to give good results: 144 liters of sisal hemp juice or juice of the similar *Agaves*; 8 ounces of scraped raw potatoes; 8 ounces of coarse brown sugar; 8 ounces of ground Indian corn; and ½ ounce of the down of *pinuela* plant. These ingredients are mixed and the mixture allowed to ferment in any suitable vessel, during four to six hours. After the fermentation has taken place, which happens in a much shorter time than with any of the old methods of fermentation, the mixture may be distilled and purified in any well-known apparatus, although I prefer to use the apparatus and method of purification described in an application filed by me of even date herewith.

The *pinuela* plant referred to is found in Mexico and other hot countries. In Colima, Mexico, it is known by the names *xocuistc* or *chocuistle*; in Mexico Valley by *timbiriche, aguava, anona brava*; in Yucatan and other districts of Mexico it is known as *pinuela*. The plant is described in numerous English, American, and French dictionaries under the name *karatas plumieri* and also under the name *bromelia pirguin*. The plant grows wild, and at the present time is little used. It blossoms when it is about one year old, usually during the months of February or March, and the flower is followed by a fruit which ripens in May. The fruit is elongated in form, each being 4½ to 5 inches long, and there being from 150 to 200 borne on each plant. The fruit is covered with soft down of brownish color, and it is this down that I employ in carrying out my process. The down takes the place of yeast heretofore employed to start fermentation, and no yeast is required in carrying out my process. Neither is it necessary to heat the juice during fermentation, which preferably is allowed to take place at ordinary atmospheric temperature, and in an open vessel in contact with the air.

While I have given the proportions of the substances which I have found to give the best result in carrying out my process, I am aware that these proportions may be varied without departing from the spirit of my invention and the scope of my claim.

What I claim is:

The process of manufacturing alcohol which consists in mixing with the fresh cold juice obtained from plants known as *Agaves* a predetermined amount of scraped raw potatoes, coarse brown sugar, ground Indian corn, and down of the *pinuela* plant, allowing fermentation to take place during four to six hours, and distilling the alcohol from the said mixture, substantially as described.

AQUILES ERNESTO V. CASTRO.

Witnesses:
T. O. WATERLAND,
VINCENTO ORTREGO.